United States Patent
Kojima et al.

(10) Patent No.: US 9,752,650 B2
(45) Date of Patent: Sep. 5, 2017

(54) V-RIBBED BELT

(71) Applicant: Mitsuboshi Belting Ltd., Nagata-ku, Kobe-shi, Hyogo (JP)

(72) Inventors: Kazuyo Kojima, Hyogo (JP); Yusuke Suzumegano, Hyogo (JP); Yoshihito Noborikawa, Hyogo (JP); Manabu Mitsutomi, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 0 days.

(21) Appl. No.: 14/781,184

(22) PCT Filed: Mar. 27, 2014

(86) PCT No.: PCT/JP2014/059050
§ 371 (c)(1),
(2) Date: Sep. 29, 2015

(87) PCT Pub. No.: WO2014/157593
PCT Pub. Date: Oct. 2, 2014

(65) Prior Publication Data
US 2016/0053851 A1 Feb. 25, 2016

(30) Foreign Application Priority Data

Mar. 29, 2013 (JP) .................................. 2013-071815
Mar. 17, 2014 (JP) .................................. 2014-053213

(51) Int. Cl.
*F16G 1/04* (2006.01)
*F16G 5/08* (2006.01)
(Continued)

(52) U.S. Cl.
CPC ................. *F16G 5/08* (2013.01); *F16G 5/10* (2013.01); *F16G 5/20* (2013.01)

(58) Field of Classification Search
CPC ... F16G 5/20; F16G 5/08; C08L 23/16; D03D 1/0094; D10B 2201/02
(Continued)

(56) References Cited

U.S. PATENT DOCUMENTS 3,830,685 A * 8/1974 Haley .................... C08G 18/10
152/451
4,432,744 A * 2/1984 Imamura .............. D03D 1/0094
474/238
(Continued)

FOREIGN PATENT DOCUMENTS

CN 102472364 5/2012
CN 102900809 1/2013
(Continued)

OTHER PUBLICATIONS

Jun. 10, 2014—International Search Report—Intl App PCT/JP2014/059050.
(Continued)

*Primary Examiner* — Henry Liu
(74) *Attorney, Agent, or Firm* — Banner & Witcoff, Ltd.

(57) ABSTRACT

A V-ribbed belt contains an extension layer forming a belt back face, a compression layer provided on one side of the extension layer, and a tension member embedded between the extension layer and the compression layer and extending in a belt circumferential length direction. The compression layer has a plurality of V-shaped ribs formed to be extending in the belt circumferential length direction and to be a frictional power transmission surface with a pulley. The frictional power transmission surface is covered with a knitted fabric, in which the knitted fabric is knitted out of a polyester-based composite yarn and a cellulose-based natural spun yarn. The polyester-based composite yarn is a bulky yarn, and a knitting ratio of the cellulose-based natural spun
(Continued)

yarn is not less than a knitting ratio of the polyester-based composite yarn.

11 Claims, 6 Drawing Sheets

(51) Int. Cl.
*F16G 5/20* (2006.01)
*F16G 5/10* (2006.01)

(58) Field of Classification Search
USPC .................................................. 474/263, 266
See application file for complete search history.

(56) References Cited

U.S. PATENT DOCUMENTS

| | | | | |
|---|---|---|---|---|
| 4,481,051 | A * | 11/1984 | Imamura | D03D 1/0094 156/137 |
| 5,429,555 | A * | 7/1995 | Beckh | B29C 70/226 112/63 |
| 5,789,052 | A * | 8/1998 | Miller | D21F 1/0054 428/57 |
| 5,858,147 | A * | 1/1999 | Goettsch | B29C 70/22 139/DIG. 1 |
| 6,443,866 | B1 * | 9/2002 | Billups | F16G 5/20 474/260 |
| 6,464,607 | B1 * | 10/2002 | Rosenboom | C08L 23/16 474/263 |
| 7,435,198 | B2 * | 10/2008 | Tomobuchi | F16G 1/28 428/421 |
| 7,887,448 | B2 * | 2/2011 | Hineno | F16G 5/20 474/263 |
| 8,262,523 | B2 * | 9/2012 | Kanzow | D04B 21/18 474/268 |
| 8,632,650 | B2 * | 1/2014 | Mori | B29D 29/103 156/141 |
| 8,888,635 | B2 * | 11/2014 | Mori | B29D 29/103 474/237 |
| 2003/0176593 | A1 * | 9/2003 | Bordes | C04B 16/0675 525/419 |
| 2005/0037882 | A1 * | 2/2005 | Hineno | C08L 21/00 474/263 |
| 2005/0215157 | A1 * | 9/2005 | Dugan | D01F 8/04 442/411 |
| 2006/0063627 | A1 * | 3/2006 | Tomobuchi | F16G 1/28 474/205 |
| 2007/0060431 | A1 * | 3/2007 | Hineno | F16G 5/20 474/263 |
| 2007/0214765 | A1 * | 9/2007 | Teshima | D02G 3/32 57/293 |
| 2007/0249451 | A1 * | 10/2007 | Wu | F16G 1/28 474/263 |
| 2008/0261739 | A1 * | 10/2008 | Kanzow | D04B 21/18 474/266 |
| 2009/0233746 | A1 * | 9/2009 | Leighton | B65G 15/34 474/268 |
| 2010/0167860 | A1 * | 7/2010 | Mori | B29D 29/103 474/252 |
| 2010/0173740 | A1 * | 7/2010 | Mori | B29D 29/103 474/252 |
| 2012/0067706 | A1 * | 3/2012 | Terada | B65G 15/32 198/844.1 |
| 2012/0115658 | A1 * | 5/2012 | Kanzow | D02G 3/447 474/238 |
| 2013/0037163 | A1 * | 2/2013 | Teshima | D02G 3/406 139/391 |
| 2013/0260129 | A1 * | 10/2013 | Agzikara | D02G 3/324 428/221 |
| 2014/0135161 | A1 * | 5/2014 | Mori | B29D 29/103 474/238 |
| 2014/0364262 | A1 * | 12/2014 | Mori | B29D 29/103 474/265 |
| 2014/0378256 | A1 * | 12/2014 | Tamura | F16G 5/08 474/265 |
| 2015/0024892 | A1 * | 1/2015 | Hineno | F16G 1/10 474/237 |
| 2015/0246776 | A1 * | 9/2015 | Shoji | B65H 5/02 198/846 |

FOREIGN PATENT DOCUMENTS

| | | |
|---|---|---|
| JP | S62-188837 A | 8/1987 |
| JP | H07-243483 A | 9/1995 |
| JP | H09-32886 A | 2/1997 |
| JP | 2000-177025 | 6/2000 |
| JP | 2002-122187 A | 4/2002 |
| JP | 2004-332160 A | 11/2004 |
| JP | 2005-180589 A | 7/2005 |
| JP | 2008-111518 A | 5/2008 |
| JP | 2008-115974 A | 5/2008 |
| JP | 2010-242825 A | 10/2010 |
| JP | 2010-539394 A | 12/2010 |
| JP | 2012-045895 A | 3/2012 |
| JP | 4942767 B2 | 5/2012 |
| JP | 2013-213576 A | 10/2013 |
| WO | 2012/062480 A2 | 5/2012 |

OTHER PUBLICATIONS

Nov. 4, 2015—(JP) Notification—App 2014-053213, Eng Tran.
Nov. 30, 2015 (drafted) Dec. 8, 2015 (issued)—(JP) Notification of Reasons for Refusal—App 2014-053213, Eng Tran.
Jul. 5, 2016—(JP) Notification of Reasons for Refusal—App 2014-053213.
Nov. 3, 2016—(EP) Extended Search Report—App 14774679.6.
Apr. 25, 2016—(CN) Notification of First Office Action—App 201480019445.2, Eng Tran.
Jan. 3, 2017—(CN) Notification of the Second Office Action—App 201480019445.2, Eng Tran.
Apr. 13, 2017—(JP) Notification of Reasons for Refusal—App 2016-163687, Eng Tran.
Jul. 4, 2017—(CN) Notification of the Third Office Action—App 201480019445.2, Eng Tran.

\* cited by examiner

Fig. 3(a)
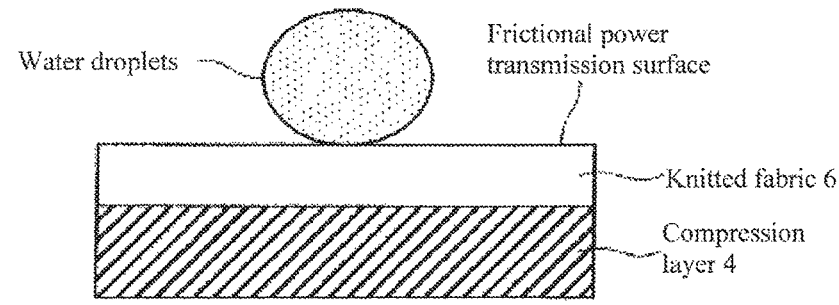
Fig. 3(b)
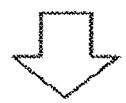
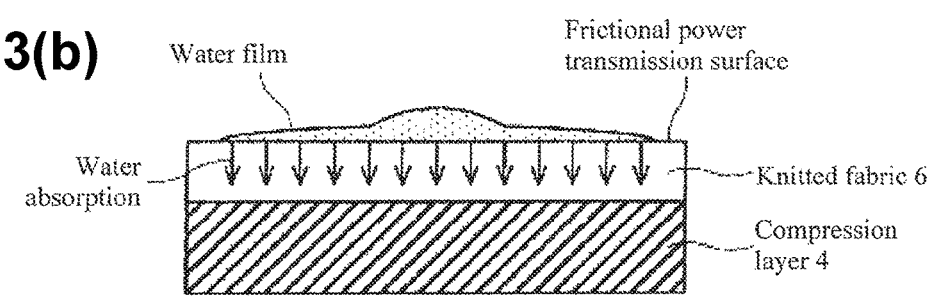
Fig. 3(c)
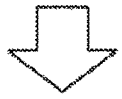
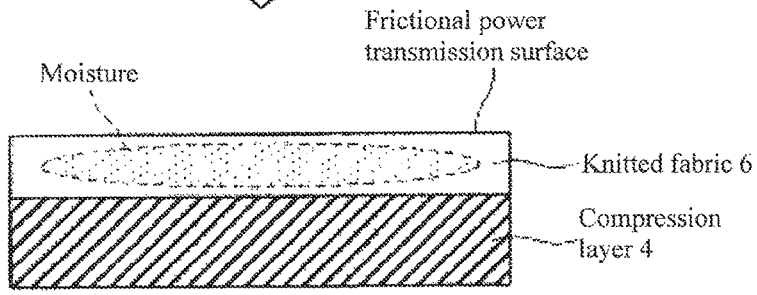

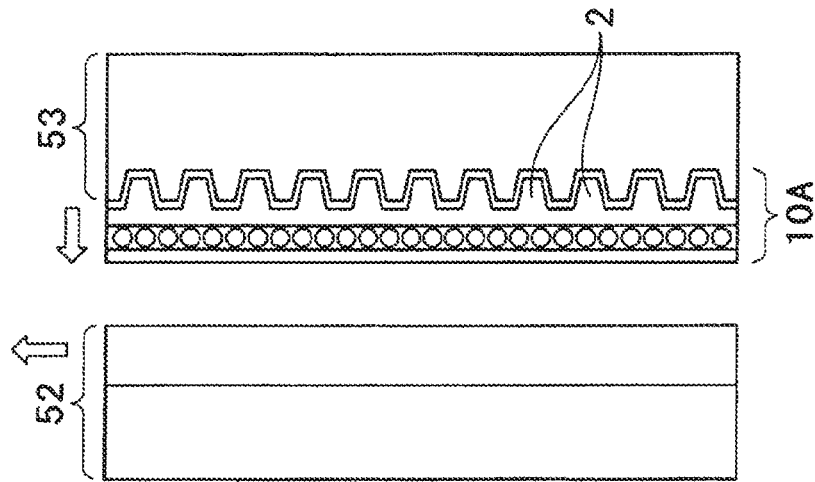
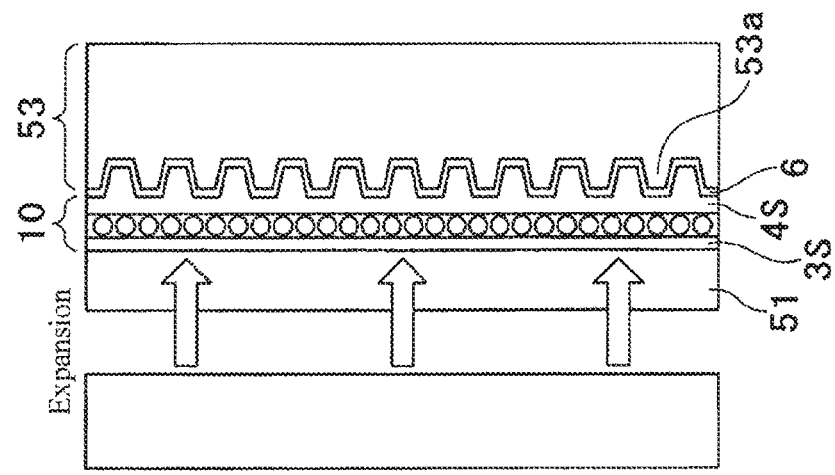
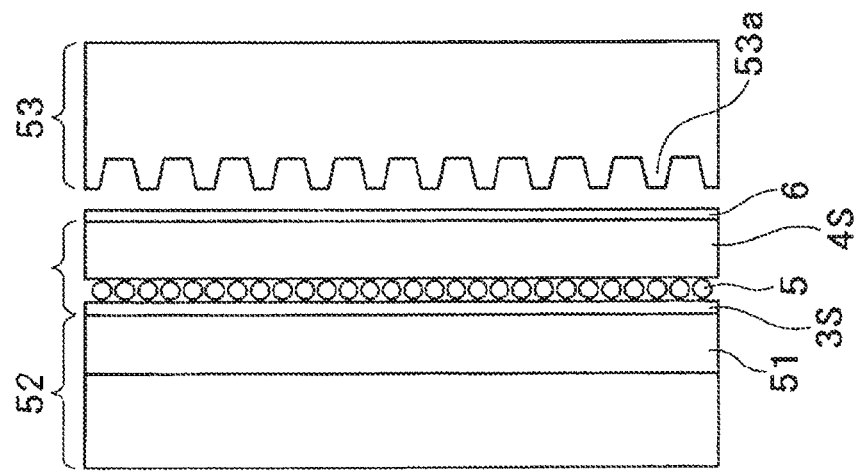

V-RIBBED BELT

CROSS REFERENCE TO RELATED APPLICATIONS

This is a U.S. National Phase Application under 35 U.S.C. §371 of International Application No. PCT/JP2014/059050, filed Mar. 27, 2014, which claims priority to Japanese Application Nos. 2013-071815 and 2014-053213, filed Mar. 29, 2013 and Mar. 17, 2014, respectively, the entire disclosures of which are incorporated herein by reference.

TECHNICAL FIELD

The present invention relates to a V-ribbed belt in which a frictional power transmission surface is covered with a knitted fabric.

BACKGROUND ART

Auxiliary machines of automobiles, such as an air compressor and an alternator, are driven by using a belt power transmission device with an engine as a driving source. As a power transmission belt of the belt power transmission device, there has been frequently used a V-ribbed belt which contains an extension layer that forms a belt back face, a compression layer provided on one side of the extension layer, and a tension member that is embedded between the extension layer and the compression layer and extends in the belt circumferential length direction, and which has a plurality of V-shaped ribs formed in the compression layer and extending in the belt circumferential length direction, which provide a frictional power transmission surface with a pulley.

The V-ribbed belt includes one in which the formation of the ribs is performed by grinding and one in which the parts are molded in a mold. In the one in which the ribs are molded in a mold, since a grinding step is not required and a fabric to be mentioned later can be fixed to the frictional power transmission surface at the time of molding, the production process becomes simple and the yield of rubber and the like that form the belt body can be greatly improved.

In recent years, there are severe requirements for quietness in the automotive field and measures to suppress noise generation have been requested also for the V-ribbed belt for driving the auxiliary machines. The cause of the noise generation resulting from this belt includes a stick slip with a pulley, which occurs at the time of large fluctuation in the belt speed or under high load conditions. During driving in rainy weather and the like, water enters into the engine compartment and the water adheres between the belt and the pulley to lower the friction coefficient of the belt, so that slip noise may be generated.

Furthermore, for the V-ribbed belt for driving auxiliary machines, it is required to have a consistently high power transmission performance regardless of weather conditions. When rubber is exposed on the frictional power transmission surface, there is a problem that the friction coefficient is high in a dry state. Also, since the friction coefficient is considerably decreased due to a water film formed at the interface in a wet state, there is a problem that, when water enters into the engine compartment during driving in rainy weather or the like, the water adheres between the belt and the pulley to lower the friction coefficient of the belt and stick slip noise (squeak noise) is generated. Also, the rubber has a problem that deterioration with time is prone to occur.

Against these problems, there have been known a method of blending short fibers into the compression layer that forms the frictional power transmission surface and making the short fibers expose on the frictional power transmission surface, and a method of covering the frictional power transmission surface with a fabric formed of fibers. In the V-ribbed belt in which the ribs are molded with a mold, the method of covering the frictional power transmission surface with a fabric is suitable since the fabric can be fixed on the frictional power transmission surface simultaneously at the time of molding.

The fabric includes woven fabrics prepared by weaving and knitted fabrics prepared by knitting. The knitted fabrics (see, e.g., Patent Documents 1 and 2) have flexibility that enables easy fitting to the frictional power transmission surface on which concavities and convexities are formed by a plurality of the ribs, and also have an advantage that stretchability so as to stretch by following the deformation of the belt body can be easily secured.

In the one described in Patent Document 1, the knitted fabric is obtained by warp knitting with two different yarns, in which the first yarn is composed of a filament of a polyamide or the like having a higher rate than 5N/1000 dtex at the time of 5% elongation and the second yarn is composed of a filament of an elastic polyurethane or the like having a lower rate than 5 cN/1000 dtex at the time of 5% elongation. It also discloses that a flock layer in which short fibers of cotton or the like are subjected to flocking may be provided.

In the one described in Patent Document 2, the knitted fabric contains an elastic yarn of a polyurethane or the like and at least one non-elastic yarn, in which the non-elastic yarn contains a cellulose-based fiber or yarn of cotton or the like.

BACKGROUND ART DOCUMENTS

Patent Documents

Patent Document 1: Japanese Patent No. 4942767
Patent Document 2: JP-T-2010-539394

SUMMARY OF THE INVENTION

Problems that the Invention is to Solve

In the conventional V-ribbed belts described in Patent Documents 1 and 2 in which the fabric is a knitted fabric, since the knitted fabric is stretched to allow a rubber to easily permeate therethrough, the rubber of the belt body is prone to exude onto the frictional power transmission surface. Therefore, the friction coefficient of the frictional power transmission surface in a dry state increases and also the friction coefficient in a wet state decreases, so that a difference in the friction coefficient between the both states cannot be sufficiently reduced and a difference in power transmission performance generates between a dry state and a wet state, and also there is a problem that noise suppression properties in a wet state are poor.

Furthermore, in the cases where a flock layer of short fibers of cotton is provided in Patent Document 1 and a cellulose-based one such as cotton is used as a non-elastic yarn in Patent Document 2, a small amount of water can be absorbed due to the water absorbency of the cotton. However, when the amount of water intruding into the interface of the frictional power transmission surface increases as in the case of driving when the rain comes down in earnest, the water cannot be sufficiently absorbed and there is a problem that the friction coefficient of the frictional power transmission surface in a wet state decreases. The one described in Patent Document 1 also has a disadvantage that extra time and labor are required for flocking of the short fibers of cotton.

Accordingly, an object of the present invention is to suppress the increase in the friction coefficient of the frictional power transmission surface in a dry state and the decrease in the friction coefficient of the frictional power transmission surface in a wet state, thereby sufficiently reducing the difference in the friction coefficient between the dry state and the wet state, by a V-ribbed belt having a frictional power transmission surface covered with a knitted fabric.

Means for Solving the Problems

In order to solve the above problem, the present invention employs the configuration where in a V-ribbed belt containing an extension layer that forms a belt back face, a compression layer provided on one side of the extension layer and a tension member that are embedded between the extension layer and the compression layer and extends in the belt circumferential length direction, in which the compression layer has a plurality of V-shaped ribs formed to be extending in the belt circumferential length direction and to be a frictional power transmission surface with a pulley and in which the frictional power transmission surface is covered with a knitted fabric, the knitted fabric is knitted out of a polyester-based composite yarn and a cellulose-based natural spun yarn, the polyester-based composite yarn is a bulky yarn, and the knitting ratio of the cellulose-based natural spun yarn is not less than the knitting ratio of the polyester-based composite yarn.

By adopting the configuration, the rubber of the belt body is suppressed from exuding onto the frictional power transmission surface owing to the bulkiness of the bulky yarn to thereby prevent the increase in the friction coefficient of the frictional power transmission surface in a dry state and the decrease in the friction coefficient of the frictional power transmission surface in a wet state, and also the knitting ratio of the water absorbable cellulose-based natural spun yarn is increased to thereby enhance water absorbing capacity from the frictional power transmission surface and to prevent the friction coefficient of the frictional power transmission surface from decreasing in a wet state, thereby enabling sufficient reduction of the difference in the friction coefficient between the wet state and the dry state.

The bulky yarn is a textured yarn in which the bulkiness of the cross-section is increased by generating crimps to the fibers (crimpability) or covering a core yarn with another yarn. Incidentally, the knitted fabric may be either weft knitted one or warp knitted one.

The knitting ratio of the cellulose-based natural spun yarn is suitably from 50% to 95% by mass. When the knitting ratio is less than 50% by mass, there is a case where sufficient water absorbability cannot be secured. When it exceeds 95% by mass, the ratio of the cellulose-based natural spun yarn that is inferior in abrasion resistance to the polyester-based composite yarn increases and the abrasion resistance of the knitted fabric decreases in some cases.

The polyester-based composite yarn is suitably a composite yarn (PTT/PET conjugate yarn) in which polytrimethylene terephthalate (PTT) and polyethylene terephthalate (PET) are conjugated, or a composite yarn (PET/PU covering yarn) in which a polyurethane (PU) yarn is used as a core and its surface is covered with polyethylene terephthalate (PET). The PTT/PET conjugate yarn is a bulky yarn obtained by spinning components of PTT and PET into an adhered form so as not to mix with each other and subjected to a heat treatment to generate crimpability by utilizing the difference in thermal shrinkage between the both. The PET/PU covering yarn is a bulky yarn in which a PU elastic yarn is used as a core and a PET yarn is wound on its surface.

By using a cotton yarn as the cellulose-based natural spun yarn, the water absorbability can be more enhanced.

By using a multilayered knitted one as the knitted fabric, the bulkiness of the knitted fabric with which the frictional power transmission surface is covered is increased and thereby the exudation of the rubber of the belt body onto the frictional power transmission surface can be more surely prevented.

By arranging a large amount of the cellulose-based natural spun yarn in the layer on the frictional power transmission surface side in the thickness direction of the multilayered knitted fabric, the water absorbing effect owing to the cellulose-based natural spun yarn on the frictional power transmission surface can be more enhanced.

By providing a bulky layer of the knitted fabric on the frictional power transmission surface, the exudation of the rubber of the belt body onto the frictional power transmission surface can be more surely prevented. The method for providing the bulky layer includes a method of increasing the layer of the knitted fabric and a method of increasing the bulkiness of the bulky yarn.

By incorporating or adhering a hydrophilizing agent to the knitted fabric, the wettability of the knitted fabric with water is improved and the water entering into the frictional power transmission surface is allowed to spread, and thereby the efficiency of water absorption by the cellulose-based natural spun yarn can be enhanced.

The knitted fabric is suitably knitted by weft knitting. Since it is excellent in stretchability, the knitted fabric resulting from weft knitting can be more easily fitted to the frictional power transmission surface on which concavities and convexities are formed with the ribs.

Advantageous Effects of the Invention

In the V-ribbed belt according to the present invention, the knitted fabric is knitted out of a polyester-based composite yarn and a cellulose-based natural spun yarn, the polyester-based composite yarn is a bulky yarn, and the knitting ratio of the cellulose-based natural spun yarn is not less than the knitted ratio of the polyester-based composite yarn. Therefore, an increase in the friction coefficient of the frictional power transmission surface in a dry state and a decrease in the friction coefficient of the frictional power transmission surface in a wet state can be suppressed and thus a difference in the friction coefficient between the dry state and the wet state can be sufficiently reduced.

BRIEF DESCRIPTION OF THE DRAWINGS

FIGS. 3(a), (b) and (c) are conceptual charts explaining the effect of water absorption on a frictional power transmission surface by hydrophilization treatment of a knitted fabric.

FIGS. 4(a), (b) and (c) are conceptual charts explaining a process for producing a V-ribbed belt of FIG. 1.

MODES FOR CARRYING OUT THE INVENTION

Figure 1:
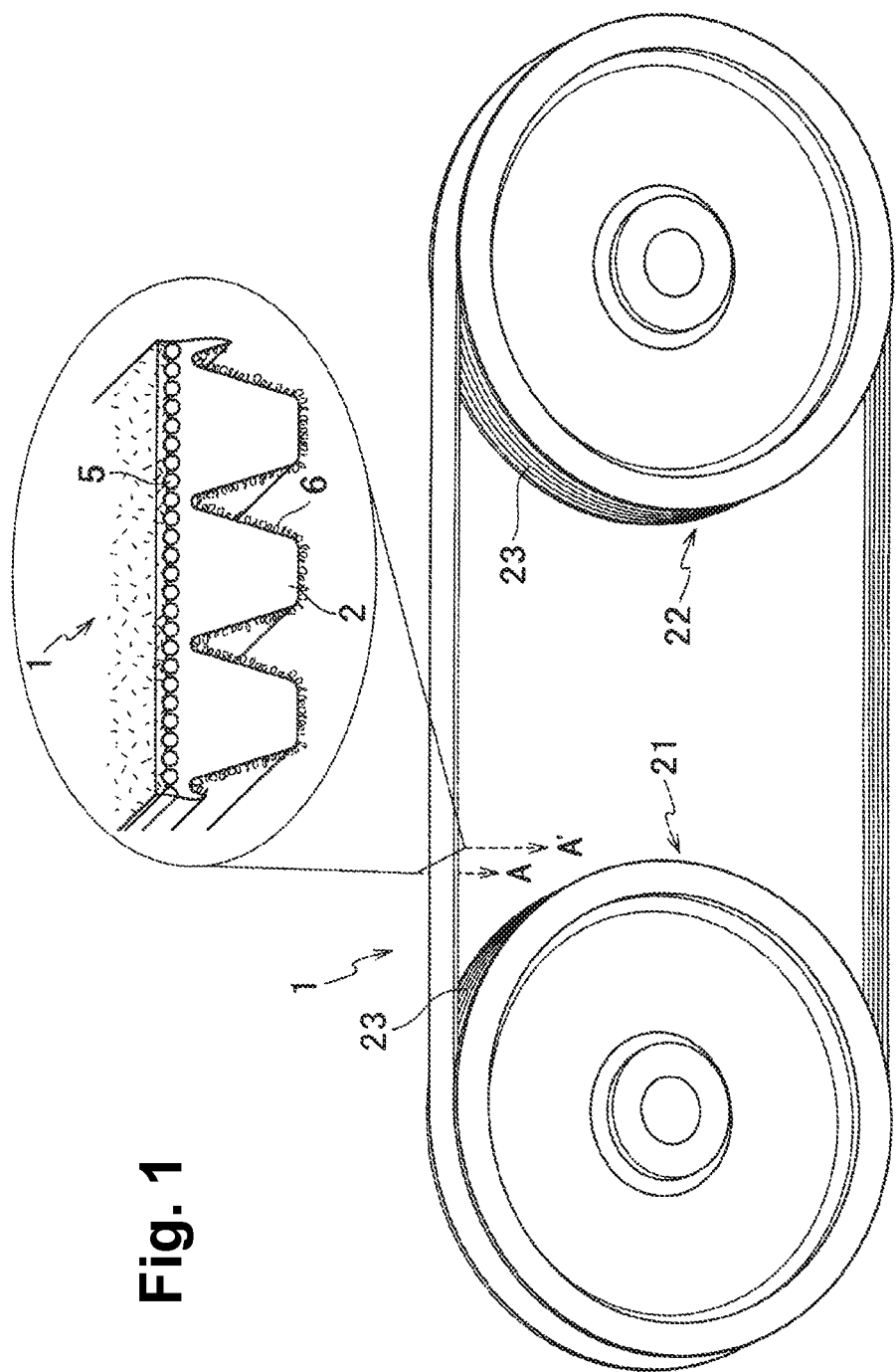
FIG. 1 is a schematic perspective view illustrating an example of a belt power transmission device using a V-ribbed belt according to the present invention.

The following will describe embodiments of the present invention based on the drawings. FIG. 1 illustrates an example of a belt power transmission device for driving auxiliary machines using a V-ribbed belt 1 according to the present invention. This belt power transmission device is the simplest example where one driving pulley 21 and one driven pulley 22 are provided and the V-ribbed belt 1 is wound around the pulleys 21 and 22. In the endless V-ribbed belt 1, a plurality of V-shaped ribs 2 extending in the belt circumferential length direction are formed on the inner circumference side thereof and, on the outer circumference surface of each of the pulleys 21 and 22, a plurality of V-shaped grooves 23 for fitting individual ribs 2 of the V-ribbed belt 1 are provided.

Figure 2:
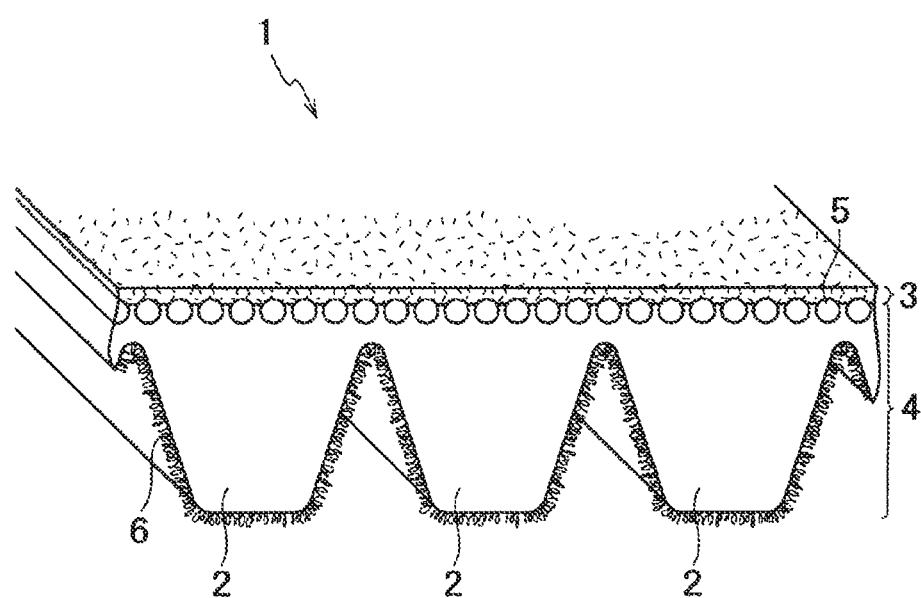
FIG. 2 is a cross-sectional view of a V-ribbed belt along the A-A cross-section in FIG. 1.

As illustrated in FIG. 2, the V-ribbed belt 1 contains an extension layer 3 that forms the belt back face on the outer circumference side, a compression layer 4 provided on the inner circumference side of the extension layer 3, and a tension member 5 that is embedded between the extension layer 3 and the compression layer 4 and extends in the belt circumferential length direction, in which a plurality of the V-shaped ribs 2 extending in the belt circumferential length direction are formed in the compression layer 4 and the surface of the rib 2 to be the frictional power transmission surface is covered with a knitted fabric 6. Both the extension layer 3 and the compression layer 4 are, as mentioned later, formed of a rubber composition. Incidentally, if necessary, an adhesive layer may be provided between the extension layer 3 and the compression layer 4. The adhesive layer is provided for the purpose of improving the adhesion of the tension member 5 with the extension layer 3 and the compression layer 4 but it is not essential. The form of the adhesive layer may be a form of embedding the entire tension member 5 in the adhesive layer or a form of embedding the tension member 5 between the adhesive layer and the extension layer 3 or the compression layer 4.

The rubber component of the rubber composition forming the compression layer 4 includes vulcanizable or crosslinkable rubbers such as diene-based rubbers (natural rubber, isoprene rubber, butadiene rubber, chloroprene rubber, styrene-butadiene rubber, acrylonitrile-butadiene rubber, hydrogenated nitrile rubber, a mixed polymer of hydrogenated nitrile rubber and an unsaturated carboxylic acid metal salt, etc.), ethylene-α-olefin elastomers, chlorosulfonyl polyethylene rubbers, alkylated chlorosulfonyl polyethylene rubbers, epichlorohydrin rubbers, acrylic rubbers, silicone rubbers, urethane rubbers, fluororubbers, and the like.

Of these, preferred are those in which an unvulcanized rubber layer is formed of a rubber composition containing sulfur or an organic peroxide and the unvulcanized rubber layer is vulcanized or cross-linked. In particular, ethylene-α-olefin elastomers (ethylene-α-olefin-based rubbers) are preferable from the viewpoint that they contain no harmful halogen, have ozone resistance, heat resistance and cold resistance, and are also excellent in economical efficiency. Examples of the ethylene-α-olefin elastomers include ethylene-α-olefin rubbers, ethylene-α-olefin-diene rubbers, and the like. As the α-olefin, propylene, butene, pentene, methylpentene, hexene, octane, and the like may be mentioned. These α-olefins may be used alone or in combination of two or more kinds thereof. Furthermore, as the diene monomers serving as raw materials thereof, non-conjugated diene monomers, for example, dicyclopentadiene, methylenenorbornene, ethylidenenorbornene, 1,4-hexadiene, cyclooctadiene, and the like may be mentioned. These diene monomers may be used alone or in combination of two or more kinds thereof.

Representative examples of the ethylene-α-olefin elastomers include ethylene-α-olefin rubbers (ethylene-propylene rubber), ethylene-α-olefin-diene rubbers (ethylene-propylene-diene copolymers), and the like. In the ethylene-α-olefin elastomer, the ratio of ethylene to the α-olefin (mass ratio of the former/the latter) is suitably in the range of from 40/60 to 90/10, preferably from 45/55 to 85/15, and more preferably from 55/45 to 80/20. The ratio of the diene may be selected from the range of from 4 to 15% by mass, and is suitably in the range of, for example, from 4.2 to 13% by mass, and preferably from 4.4 to 11.5% by mass. Incidentally, the iodine value of the ethylene-α-olefin-diene elastomer containing a diene component is suitably in the range of, for example, from 3 to 40, preferably from 5 to 30, and more preferably from 10 to 20. When the iodine value is too small, the vulcanization of the rubber composition becomes insufficient and abrasion and/or adhesion are prone to occur. When the iodine value is too large, scorch of the rubber composition becomes short and handling becomes difficult, and also heat resistance tends to decrease.

As the organic peroxide that crosslinks the unvulcanized rubber layer, diacyl peroxides, peroxy esters, dialkyl peroxides (dicumyl peroxide, t-butylcumyl peroxide, 1,1-di-butylperoxy-3,3,5-trimethylcyclohexane, 2,5-dimethyl-2,5-di (t-butylperoxy)-hexane, 1,3-bis(t-butylperoxy-isopropyebenzene, di-t-butyl peroxide, etc.), and the like may be mentioned. These organic peroxides may be used alone or in combination of two or more kinds thereof. Suitable organic peroxides show a half-life of one minute by thermal decomposition of from 150° C. to 250° C., and preferably from about 175° C. to 225° C.

The ratio of the vulcanizing agent or the crosslinking agent (especially, the organic peroxide) of the unvulcanized rubber layer is suitably from 1 to 10 parts by mass, preferably from 1.2 to 8 parts by mass, and more preferably from 1.5 to 6 parts by mass in terms of solid content per 100 parts by mass of rubber components (ethylene-α-olefin elastomer and the like).

The rubber composition may contain a vulcanization accelerator. As the vulcanization accelerator, thiuram-based accelerators, thiazole-based accelerators, sulfenamide-based accelerators, bismaleimide-based accelerators, urea-based accelerators, and the like may be mentioned. These vulcanization accelerators may be used alone or in combination of two or more kinds thereof. The ratio of the vulcanization accelerator is suitably from 0.5 to 15 parts by mass, preferably from 1 to 10 parts by mass, and more preferably from 2 to 5 parts by mass in terms of solid content per 100 parts by mass of rubber components.

Also, the rubber composition may further contain a co-crosslinking agent (a crosslinking aid or a co-vulcanizing agent), in order to increase the degree of crosslinking and to prevent adhesion and abrasion. As the co-crosslinking agent, there may be mentioned conventional crosslinking aids, for example, polyfunctional (iso)cyanurates (triallyl isocyanurate, triallyl cyanurate, etc.), polydienes (1,2-polybutadiene etc.), metal salts of unsaturated carboxylic acids (zinc (meth)acrylate, magnesium (meth)acrylate, etc.), oximes (quinone dioxime etc.), guanidines (diphenylguanidine etc.), polyfunctional (meth)acrylates (ethylene glycol di(meth)acrylate, butanediol di(meth)acrylate, trimethylolpropane tri(meth)acrylate, etc.), bismaleimides (N,N'-m-phenylenebismaleimide etc.), and the like. These crosslinking aids may be used alone or in combination of two or more kinds thereof. The ratio of the crosslinking aid (total amount in the case of combining multiple species) is suitably from 0.01 to 10 parts by mass, and preferably from 0.05 to 8 parts by mass in terms of solid content per 100 parts by mass of the rubber component.

Moreover, the rubber composition may contain short fibers, if necessary. As the short fibers, there may be mentioned cellulose-based fibers (cotton, rayon, etc.), polyester-based fibers (PET, PEN fibers, etc.), aliphatic polyamide fibers (nylon 6 fibers, nylon 66 fibers, nylon 46 fibers, etc.), aromatic polyamide fibers (p-aramid fibers, m-aramid fibers, etc.), vinylon fibers, polyparaphenylene benzobisoxazole fibers, and the like. These short fibers may be subjected to a conventional adhesive treatment or surface treatment, for example, a treatment with an RFL solution or the like, in order to enhance the dispersibility in the rubber composition and the adhesiveness. The ratio of the short fibers is suitably from 1 to 50 parts by mass, preferably from 5 to 40 parts by mass, and more preferably from 10 to 35 parts by mass per 100 parts by mass of rubber components.

Furthermore, the rubber composition may contain, if necessary, conventional additives, for example, vulcanization aids, vulcanization retarders, reinforcing agents (carbon black, silicon oxide such as hydrated silica, etc.), fillers (clay, calcium carbonate, talc, mica, etc.), metal oxides (zinc oxide, magnesium oxide, calcium oxide, barium oxide, iron oxide, copper oxide, titanium oxide, aluminum oxide, etc.), plasticizers (oils such as paraffinic oils, naphthenic oils, and process oils, etc.), processing agents or processing aids (stearic acid, stearic acid metal salts, waxes, paraffins, fatty acid amide, etc.), aging inhibitors (antioxidants, thermal aging inhibitors, bending crack inhibitors, ozone deterioration inhibitors, etc.), colorants, tackifiers, coupling agents (silane coupling agents etc.), stabilizers (UV absorbers, antioxidants, ozone deterioration inhibitors, thermal stabilizers, etc.), lubricants (graphite, molybdenum disulfide, ultrahigh molecular weight polyethylene, etc.), flame retardants, antistatic agents, and the like. The metal oxides may be allowed to act as cross-linking agents. These additives may be used alone or in combination of two or more kinds thereof. The ratios of these additives may be selected from conventional ranges depending on the types and, for example, per 100 parts by mass of rubber components, the ratio of the reinforcing agents (carbon black, silica, etc.) is suitably from 10 to 200 parts by mass (preferably from 20 to 150 parts by mass), the ratio of the metal oxides (zinc oxide etc.) is suitably from 1 to 15 parts by mass (preferably from 2 to 10 parts by mass), the ratio of the plasticizer (oils such as paraffin oil) is suitably from 1 to 30 parts by mass (preferably from 5 to 25 parts by mass), and the ratio of the processing agents (stearic acid etc.) is suitably from 0.1 to 5 parts by mass (preferably from 0.5 to 3 parts by mass).

The extension layer 3 may be formed of the same rubber composition (rubber composition containing a rubber component such as an ethylene-α-olefin elastomer) as in the case of the compression layer 4, and may be formed of a fabric (reinforcing fabric) such as canvas. As the reinforcing fabric, fabrics such as woven fabrics, wide-angle canvas, knitted fabrics, and non-woven fabrics may be mentioned. Of these, woven fabrics that are woven in the form of plain weave, twill weave or satin weave, wide angle canvas in which intersection angle between the warp and the weft is about 90° to 130°, and knitted fabrics are preferred. As the fibers constituting the reinforcing fabric, use can be made of the same fibers as the short fibers. The reinforcing fabric may be subjected to a treatment (immersion treatment or the like) with an RFL solution and then to a coating treatment, to thereby convert into canvas with a rubber.

The extension layer 3 is preferably formed of the same rubber composition as that of the compression layer 4. As the rubber component of the rubber composition, the same line or same type of rubber as the rubber component of the compression layer 4 is frequently used. In addition, the ratios of the additives such as vulcanizing agent or cross-linking agent, co-crosslinking agent, and vulcanization accelerator can be also selected from the same ranges as in the case of the rubber composition of the compression layer 4, respectively.

The rubber composition of the extension layer 3 may contain the same short fiber as in the case of the compression layer 4, in order to suppress the generation of abnormal noise due to sticking of the back face rubber during back face driving. The form of the short fiber may be straight or may be a partially bent shape (e.g., a milled fiber described in JP-A-2007-120507). During traveling of the V-ribbed belt 1, there is a concern that a crack is generated in the belt circumference direction of the belt in the extension layer 3 and the V-ribbed belt 1 may be ring-cleaved, but it can be prevented by orienting the short fibers in a belt width direction or in random directions. Moreover, in order to suppress the generation of the abnormal noise during back face driving, an uneven pattern may be provided on the surface (belt back face) of the extension layer 3. As the uneven pattern, a knitted fabric pattern, a woven fabric pattern, a cord woven fabric pattern, an embossed pattern (e.g., a dimple shape), and the like may be mentioned, and the size and depth thereof are not particularly limited.

The tension member 5 is not particularly limited and use can be made of a cord formed of a polyester fiber (polybutylene terephthalate fiber, polyethylene terephthalate fiber, polytrimethylene terephthalate-based fiber, polyethylene naphthalate fiber, etc.), an aliphatic polyamide (nylon) fiber (nylon 6 fiber, nylon 66 fiber, nylon 46 fiber, etc.), an aromatic polyamide (aramid) fiber (co-poly-p-phenylene-3,4'oxydiphenylene-terephthalamide fiber, poly-p-phenylene-terephthalamide fiber, etc.), a polyarylate fiber, a glass fiber, a carbon fiber, a PBO fiber, or the like. These fibers may be used alone or in combination of two or more kinds thereof. Moreover, these fibers may be appropriately selected depending on the expansion coefficient of the flexible jacket 51 to be mentioned later. For example, in the case of such a high elongation that the expansion coefficient exceeds 2%, a polyester fiber (especially, low elastic polybutylene terephthalate fiber) and a nylon fiber (especially, nylon 66 fiber, nylon 46 fiber) having low elastic modulus are preferred. This is because, in the case of a fiber having high elastic modulus, such as an aramid fiber or a PBO fiber, the fiber cannot be sufficiently elongated even when the flexible jacket 51 is expanded and hence the pitch line of the tension member 5 to be embedded in the V-ribbed belt 1 may be not stabilized or a proper shape of the rib 2 may be not formed. Therefore, in order to use the high elastic modulus fiber, it is preferable to set the expansion coefficient of the flexible jacket 51 low (e.g., about 1%).

The knitted fabric 6 may be made by either weft knitting or warp knitting but, since weft knitting is excellent in stretchability, it can be easily fitted to the frictional power transmission surface on which concavities and convexities are formed with the ribs 2. As those knitted into a single layer by weft knitting, there may be mentioned plain stitch (jersey stitch), rib stitch, tuck stitch, pearl stitch, and the like; and as those knitted into a multilayer, there may be mentioned smooth stitch, interlock stitch, double rib stitch, single pique stitch, ponte rome stitch, Milano rib stitch, double jersey stitch, Kanoko stitch (moss stitch) (front Kanoko, back Kanoko, both side Kanoko), and the like. As those knitted into a single layer by warp knitting, there may be mentioned single denbigh, single code, and the like; and, as those knitted into a multilayer, there may be mentioned half tricot, double denbigh, double atlas, double code, double tricot, and the like.

The knitted fabric 6 is knitted out of a polyester-based composite yarn and a cellulose-based natural spun yarn (e.g., cotton yarn). The polyester-based composite yarn is a bulky yarn.

The bulky yarn is a textured yarn in which the bulkiness of the cross-section is increased by generating crimps to the fibers (crimpability) or covering a core yarn with another yarn.

The bulky yarn includes composite yarns (conjugate yarns), covering yarns, crimped yarns, woolly textured yarns, taslan textured yarns, interlace textured yarns, and the like. As a polyester-based composite yarn that is a bulky yarn, a conjugate yarn or a covering yarn is preferred.

The conjugate yarn has a cross-sectional structure in which two kinds of polymers are bonded in the fiber axis direction and becomes a bulky yarn through the generation of crimps resulting from the difference in shrinkage ratio of both polymers when heat is applied during manufacture or processing. For example, there are a composite yarn (PTT/PET conjugate yarn) in which polytrimethylene terephthalate (PTT) and polyethylene terephthalate (PET) are conjugated and a composite yarn (PBT/PET conjugate yarn) in which polybutylene terephthalate (PBT) and polyethylene terephthalate (PET) are conjugated. The covering yarn is a yarn in which the bulkiness of cross-section of the entire yarn is increased by covering the circumference of the core yarn with another yarn. For example, there are a composite yarn (PET/PU covering yarn) in which a polyurethane (PU) yarn having excellent stretchability is used as a core and the surface thereof is covered with polyethylene terephthalate (PET) and a composite yarn (PA/PU covering yarn) in which PU as a core is covered with a polyamide (PA). Among these composite yarns, the PTT/PET conjugate fiber or the PET/PU covering yarn, both of which are excellent in stretchability and abrasion resistance, is preferred.

As the cellulose-based natural spun yarn, examples thereof include natural plant-derived cellulose fibers (pulp fibers) such as bamboo fibers, sugar cane fibers, seed hair fibers (cotton fiber (cotton linters), kapok, etc.), bast fibers (e.g., hemp, paper mulberry, mitsumata, etc.), and leaf fibers (e.g., Manila hemp, New Zealand hemp, etc.); animal-derived cellulose fibers such as wool, silk, and sea squirt cellulose; bacterial cellulose fibers; and yarns obtained by spinning algae celluloses. Of these, particularly, in view of excellent water absorbency, the cotton fiber is preferred.

The knitting ratio of the cellulose-based natural spun yarn is preferably from 50% to 95% by mass. Moreover, as the knitted fabric structure, single layer or multilayer knitted fabric 6 can be used but, in order to prevent exudation of the rubber of the belt body more surely, the multilayer knitted fabric structure is preferred.

By knitting the knitted fabric with incorporating the bulky yarn, the bulkiness of the knitted fabric can be increased. The bulkiness of the knitted fabric 6 is preferably 2.0 $cm^3/g$ or more, and more preferably 2.4 $cm^3/g$ or more. The upper limit is not particularly limited and may be, for example, 4.0 $cm^3/g$ or less, or 3.5 $cm^3/g$ or less. Incidentally, the bulkiness ($cm^3/g$) is one obtained by dividing the thickness (cm) of the knitted fabric 6 by the mass ($g/cm^2$) per unit area. Moreover, in order to prevent exudation of the rubber of the belt body onto the frictional power transmission surface more securely, it is also preferable to provide a bulky layer of the knitted fabric on the frictional power transmission surface.

In the case where the knit fabric 6 is a multilayer knitted fabric structure, the water absorbency on the frictional power transmission surface can be further enhanced by arranging a large amount of the water-absorbable cellulose-based natural spun yarn in the layer on the frictional power transmission surface side, in the thickness direction of the knitted fabric 6.

In the case of knitting the multilayer knitted fabric, by knitting one layer out of the cellulose-based natural spun yarn alone or the cellulose-based natural spun yarn and the polyester-based composite yarn and knitting the other layer out of the polyester-based composite yarn alone, it is also possible to knit a multilayer knitted fabric in which a large amount of the cellulose-based natural spun yarn is arranged in one layer. When the layer in which a large amount of the cellulose-based natural spun yarn has been arranged is disposed on the frictional power transmission surface side, it is possible to further enhance the water absorbency on the frictional power transmission surface.

To the knitted fabric 6, a surfactant or a hydrophilic softener may be incorporated or adhered as a hydrophilizing agent. FIG. 3 includes conceptual charts explaining the behavior of water droplets adhering on the frictional power transmission surface in the case where the hydrophilizing agent is incorporated or adhered to the knitted fabric 6. When water droplets adhere to the frictional power transmission surface as shown in (a) of FIG. 3, the water droplets rapidly spread on the surface of the hydrophilized knitted fabric 6 to form a water film as shown in (b) of FIG. 3, and further, as shown in (c) of FIG. 3, the water is absorbed into the cellulose-based natural spun yarn of the knitted fabric 6 and the water film on the frictional power transmission surface disappears. Therefore, a decrease in the friction coefficient of the frictional power transmission surface in a wet state is further suppressed.

As the hydrophilizing agent, use can be made of a surfactant or a hydrophilic softener. As the method for incorporating or adhering the hydrophilizing agent to the knitted fabric, it is possible to adopt a method of spraying the hydrophilizing agent to the knitted fabric, a method of coating the knitted fabric with the hydrophilizing agent, or a method of immersing the knitted fabric in the hydrophilizing agent. Furthermore, in the case where the hydrophilizing agent is a surfactant, it is also possible to adopt a method of incorporating the surfactant into the knitted fabric by applying the surfactant onto the surface of a cylindrical outer mold where a plurality of rib molds are engraved on the inner circumferential surface thereof and performing vulcanization and molding, in the method for producing the belt to be mentioned later. Of these methods, since the hydrophilic softener can be simply and more uniformly incorporated or adhered, a method of immersing the knitted fabric in the hydrophilizing agent is preferred.

A surfactant is a generic term for substances which have a hydrophilic group having affinity to water and a hydrophobic group (lipophilic group) having affinity to an oil in the molecule and has effects of reducing surface tension to enhance wettability and decreasing the friction of an interface through the intervention of the surfactant between a substance and another substance, besides having an action of homogeneously mixing a polar substance with a non-polar substance.

The type of the surfactant is not particularly limited, and an ionic surfactant, a nonionic surfactant, and the like can be used. The nonionic surfactant may be a polyethylene glycol-type nonionic surfactant or a polyhydric alcohol-type nonionic surfactant.

The polyethylene glycol-type nonionic surfactant is a nonionic surfactant in which ethylene oxide is added to a hydrophobic base component having a hydrophobic group, such as a higher alcohol, an alkylphenol, a higher fatty acid, a polyhydric alcohol higher fatty acid ester, a higher fatty acid amide, and a polypropylene glycol to impart a hydrophilic group.

Examples of the higher alcohol as the hydrophobic base component include $C_{10-30}$ saturated alcohols such as lauryl alcohol, tetradecyl alcohol, cetyl alcohol, octadecyl alcohol, and aralkyl alcohols, $C_{10-26}$ unsaturated alcohols such as oleyl alcohol, and the like. As the alkylphenol, $C_{4-16}$ alkylphenols such as octylphenol and nonylphenol, and the like can be exemplified.

Examples of the higher fatty acid of the hydrophobic base component include saturated fatty acids (e.g., $C_{10-30}$ saturated fatty acids such as myristic acid, palmitic acid, stearic acid, arachidic acid, behenic acid, lignoceric acid, cerotic acid, and montanic acid, preferably $C_{12-28}$ saturated fatty acids, more preferably $C_{14-26}$ saturated fatty acids, especially $C_{16-22}$ saturated fatty acids, and the like; and oxycarboxylic acids such as hydroxystearic acid), unsaturated fatty acids (e.g., $C_{10-30}$ unsaturated fatty acids such as oleic acid, erucic acid, erucic acid, linoleic acid, linolenic acid, and eleostearic acid, and the like). These higher fatty acids may be either alone or in combination of two or more kinds thereof.

The polyhydric alcohol higher fatty acid ester is an ester of a polyhydric alcohol with the higher fatty acid and has an unreacted hydroxyl group. Examples of the polyhydric alcohol include alkanediols ($C_{2-10}$ alkanediols such as ethylene glycol, propylene glycol, and butanediol, etc.), alkanetriols (glycerin, trimethylolethane, trimethylolpropane, etc.), alkanetetraols (pentaerythritol, diglycerin, etc.), alkanehexaols (dipentaerythritol, sorbitol, sorbit, etc.), alkaneoctaols (sucrose, etc.), alkylene oxide adducts thereof ($C_{2-4}$ alkylene oxide adducts, etc.), and the like.

In the following, when "oxyethylene", "ethylene oxide", or "ethylene glycol" is represented by "EO", "oxypropylene", "propylene oxide", or "propylene glycol" is represented by "PO", specific examples of the polyethylene glycol-type nonionic surfactant include, for example, polyEO higher alcohol ethers (polyEO $C_{10-26}$ alkyl ethers such as polyEO lauryl ether and polyEO stearyl ether), $C_{10-26}$ higher alcohol-EO-PO adducts such as polyPO polyPO alkyl ethers; alkylphenol-EO adducts such as poly EO octylphenyl ether and polyEO nonylphenyl ether; fatty acid-EO adducts such as polyEO monolaurate, polyEO monooleate, and polyEO monostearate; glycerin mono- or di-higher fatty acid ester-EO adducts (EO adducts of glycerin mono- or di-$C_{10-26}$ fatty acid esters such as glycerin mono or dilaurate, glycerin mono or dipalmitate, glycerin mono- or distearate, and glycerin mono or diolate), pentaerythritol higher fatty acid ester-EO adducts (pentaerythritol mono- to tri-$C_{10-26}$ fatty acid ester-EO adducts such as pentaerythritol distearate-EO adduct, etc.), dipentaerythritol higher fatty acid ester-EO adducts, sorbitol higher fatty acid ester-EO adducts, sorbit higher fatty acid ester-EO adducts, sorbitan fatty acid ester-EO adducts such as polyEO sorbitan monolaurate, polyEO sorbitan monostearate, and polyEO sorbitan tristearate, polyhydric alcohol fatty acid ester-EO adducts such as sucrose higher fatty acid ester-EO adducts; higher alkylamine-EO adducts such as polyEO laurylamino ether and polyEO stearylamino ether; fatty acid amide-EO adducts such as polyEO coconut fatty acid monoethanolamide, polyEO lauric acid monoethanolamide, polyEO stearic acid monoethanolamide, and polyEO oleic acid monoethanolamide; oil and fat-EO adducts such as polyEO castor oil and polyEO hardened castor oil; polyPO-EO adducts (polyPO-polyPO block copolymers, etc.), and the like. These polyethylene glycol-type nonionic surfactants may be used alone or in combination of two or more kinds thereof.

The polyhydric alcohol-type nonionic surfactant is a nonionic surfactant in which a hydrophobic group such as a higher fatty acid is bonded to the polyhydric alcohol (especially, alkanetriol to alkanehexaol such as glycerol, pentaerythritol, sucrose, or sorbitol). Examples of the polyhydric alcohol-type nonionic surfactant include glycerin fatty acid esters such as glycerin monostearate and glycerol monooleate, pentaerythritol fatty acid esters such as pentaerythritol monostearate and pentaerythritol di-tallowate esters, sorbitan fatty acid esters such as sorbitan monolaurate and sorbitan monostearate, sorbitol fatty acid esters such as sorbitol monostearate, sucrose fatty acid esters, alkyl ethers of polyhydric alcohols, fatty acid amides of alkanolamines such as coconut fatty acid diethanolamide, alkyl polyglycosides, and the like. These polyhydric alcohol-type nonionic surfactants may also be used either alone or in combination of two or more kinds thereof and may be used in combination with the polyethylene glycol-type nonionic surfactants.

The ionic surfactants may be anionic surfactants such as alkylbenzenesulfonic acid salts, α-olefinsulfonic acid salts, long-chain fatty acid salts, alkanesulfonic acid salts, alkyl sulfuric acid salts, polyEO alkyl ether sulfuric acid ester salts, naphthalenesulfonic acid formalin condensates, and alkyl phosphoric acid salts, cationic surfactants such as alkyltrimethylammonium salts and dialkyldimethylammonium salts, amphoteric surfactants such as alkyl betaines and imidazoline derivatives, and the like.

Preferred surfactants are nonionic surfactants, in particular, polyethylene glycol-type nonionic surfactants (e.g., polyEO $C_{10-26}$ alkyl ethers, alkylphenol-EO adducts, polyhydric alcohol $C_{10-26}$ fatty acid ester-EO adducts, etc.).

The hydrophilic softener as the hydrophilizing agent is one obtained by imparting hydrophilicity to a softener used for imparting flexibility to a fibrous member such as a knitted fabric or a woven fabric. A typical softener has various effects including softening a fibrous member, improving sliding ability, preventing wrinkles, and preventing shrinkage. The hydrophilic softener is slightly inferior to the surfactant in the noise suppression properties at the time when the belt is covered with water but the flexibility of the knitted fabric can be improved, so that there are effects of prevention of wrinkles of the knitted fabric, easy winding at the time of belt production, and capability of easier fitting to the frictional power transmission surface on which concavities and convexities are formed with the ribs 2.

The hydrophilic softener is not particularly limited but polyether-modified silicone-based softeners and polyester-based softeners can be used. The polyether-modified silicone-based softener is a softener containing a silicone modified with a hydrophilic polyether group. The polyether-modified silicone-based softener may be an emulsion in which a silicone is dispersed in water together with a surfactant.

The polyester-based softener is an emulsion softener in which a hydrophilic polyester resin is dispersed in water together with a surfactant, and has a high affinity to polyester fibers, so that the hydrophilicity of the polyester-based composite yarn in the knitted fabric can be enhanced.

In the present embodiment, for a part of the knitted fabric 6, a surfactant or a hydrophilic softener is incorporated or adhered by an immersion treatment of immersing the knitted fabric 6 in the hydrophilizing agent. As the surfactant, a polyethylene glycol-type nonionic surfactant is used and the concentration of the treating solution is controlled to 0.5 to 30% by mass. In addition, as the hydrophilic softener, a polyether-modified silicone-based softener and a polyester-based softener are used, and the concentration of the treating solution is controlled to 1 to 10% by mass. The solvent of the treating liquid containing the hydrophilizing agent is not particularly limited, and general-purpose solvents such as water, hydrocarbons, ethers, and ketones may be mentioned. These solvents may be either alone or as a mixed solvent.

In either case of the immersion treatments, immersion time is not particularly limited. Immersion treatment temperature is also not particularly limited, and the treatment may be carried out under an ordinary temperature or under an elevated temperature. Also, after the immersion treatment, a drying treatment may be performed, if necessary. The drying treatment may be performed, for example, under an elevated temperature of 50° C. or higher, or preferably about 100° C. or higher.

The knitted fabric 6 may be subjected to an adhesive treatment for the purpose of improving adhesiveness with the rubber composition constituting the compression layer 4 (rubber composition forming the surface of the ribs 2). As the adhesive treatment of the knitted fabric 6, there may be mentioned an immersion treatment into a resin-based treating solution obtained by dissolving an epoxy compound or an isocyanate compound in an organic solvent (toluene, xylene, methyl ethyl ketone, etc.), an immersion treatment into a resorcin-formalin-latex solution (RFL solution), and an immersion treatment into a rubber paste obtained by dissolving a rubber composition into an organic solvent. As the other method of the adhesive treatment, for example, a friction treatment in which the knitted fabric 6 and a rubber composition are allowed to pass through a calender roll to print the rubber composition into the knitted fabric 6, a spreading treatment of applying a rubber paste to the knitted fabric 6, a coating treatment of laminating a rubber composition on the knitted fabric 6, and the like can be also adopted. By subjecting the knitted fabric 6 to the adhesive treatment as above, the adhesion with the compression layer 4 can be improved and peeling of the knitted fabric 6 at the time of traveling of the V-ribbed belt 1 can be prevented. Moreover, by performing the adhesive treatment, it is also possible to improve the abrasion resistance of the ribs 2.

The following will describe a method for producing the V-ribbed belt 1 with reference to FIG. 4. First, as shown in (a) of FIG. 4, an unvulcanized sheet 3S for the extension layer is wound on an inner mold 52 having a flexible jacket 51 mounted on the outer circumferential surface, the tension member 5 is helically spun thereon, and further, an unvulcanized sheet 4S for the compression layer and the knitted fabric 6 are wound further thereon sequentially to create a molded body 10. Thereafter, the inner mold 52 on which the molded body 10 is wound is concentrically set on the inner circumferential side of an outer mold 53 where a plurality of rib molds 53a are engraved on the inner circumferential surface. On this occasion, a predetermined clearance is provided between the inner circumferential surface of the outer mold 53 and the outer circumferential surface of the molded body 10.

Next, as shown in (b) of FIG. 4, the flexible jacket 51 is expanded toward the inner circumferential surface of the outer mold 53 at a predetermined expansion ratio (e.g., from 1 to 6%), the sheet 4S for the compression layer and the knitted fabric 6 of the molded body 10 are press-fitted to the rib molds 53a of the outer mold 53, and a vulcanization treatment (e.g., 160° C., 30 minutes) is performed in that state.

Finally, as shown in (c) of FIG. 4, after the inner mold 52 is took out from the outer mold 53 and the vulcanized rubber sleeve 10A having a plurality of ribs 2 is released from the outer mold 53, the vulcanized rubber sleeve 10A is cut into a predetermined width along a circumferential length direction by using a cutter to form a V-ribbed belt 1. The method for producing the V-ribbed belt 1 is not limited to the above method and, for example, it is also possible to adopt other known methods that are disclosed in JPA-2004-82702 and the like.

EXAMPLES

TABLE 1

|  |  |  | Ex. 1 | Ex. 2 | Ex. 3 | Ex. 4 | Ex. 5 | Ex. 6 | Ex. 7 |
|---|---|---|---|---|---|---|---|---|---|
| Knitted fabric | Knitted fabric structure | | single layer | single layer | single layer | single layer | multilayer | multilayer | multilayer |
| | Fiber configuration (entire knitted fabric) | Cellulose-based yarn | cotton | cotton | cotton | cotton | cotton | cotton | cotton |
| | | Non-cellulose-based yarn | PTT/PET | PTT/PET | PTT/PET | PET/PU | PTT/PET | PTT/PET | PET/PU |
| | | Cellulose-based yarn/Non-cellulose-based yarn (mass ratio) | 80/20 | 60/40 | 50/50 | 95/5 | 80/20 | 60/40 | 60/40 |
| | Layer configuration of multilayer knitted fabric* | Belt front side | — | — | — | — | cotton | cotton | cotton |
| | | Compression layer side | | | | | PTT/PET | PTT/PET | PET/PU |
| | | Bulkiness (cm³/g) | 2.3 | 2.3 | 2.0 | 2.3 | 2.8 | 3.2 | 2.4 |
| | | Hydrophilizing agent | — | — | — | — | — | — | — |
| | | Rubber exudation | slightly present | slightly present | slightly present | slightly present | absent | absent | absent |
| Friction coefficient μ | | Dry state | 1.3 | 1.3 | 1.5 | 1.3 | 1.1 | 1.1 | 1.1 |
| | | Wet state | 1.0 | 1.0 | 0.9 | 1.0 | 1.0 | 1.1 | 1.0 |
| | | Difference Δμ | 0.3 | 0.3 | 0.6 | 0.3 | 0.1 | 0.0 | 0.1 |

TABLE 1-continued

| | | | | | | | | |
|---|---|---|---|---|---|---|---|---|
| Noise generation limit angle (°) | Dry state | | 3.7 | no noise generation until rib misaligned | 3.7 | 3.7 | no noise generation until rib misaligned | no noise generation until rib misaligned | no noise generation until rib misaligned |
| | Wet state | | 3.3 | 3.4 | 2.8 | 3.0 | 2.0 | 3.5 | 3.0 |
| | Abrasion resistance | | B | B | A | B | B | A | A |

| | | | Ex. 8 | Ex. 9 | Ex. 10 | Comp. Ex. 1 | Comp. Ex. 2 | Comp. Ex. 3 |
|---|---|---|---|---|---|---|---|---|
| Knitted fabric | Knitted fabric structure | | multilayer | multilayer | multilayer | single layer | multilayer | multilayer |
| | Fiber configuration (entire knitted fabric) | Cellulose-based yarn | cotton | cotton | cotton | cotton | cotton | cotton |
| | | Non-cellulose-based yarn | PTT/PET | PTT/PET | PTT/PET | PU | PTT/PET | PTT/PET |
| | | Cellulose-based yarn/Non-cellulose-based yarn (mass ratio) | 60/40 | 60/40 | 60/40 | 60/40 | 30/70 | 60/40 |
| | Layer configuration of multilayer knitted fabric* | Belt front side | cotton | cotton | cotton | — | — | PTT/PET |
| | | Compression layer side | PTT/PET | PTT/PET | PTT/PET | | | cotton |
| | | Bulkiness (cm³/g) | 3.2 | 3.2 | 2.6 | 1.6 | 2.6 | 3.2 |
| | Hydrophilizing agent | | Nonionic surfactant | Polyether modified silicone-based softener | Polyester-based softener | — | — | — |
| | Rubber exudation | | absent | absent | slightly present | present | absent | absent |
| Friction coefficient μ | Dry state | | 1.1 | 0.9 | 1.1 | 1.7 | 1.3 | 1.1 |
| | Wet state | | 1.1 | 0.9 | 0.8 | 0.5 | 0.6 | 0.5 |
| | Difference Δμ | | 0.0 | 0.0 | 0.3 | 1.2 | 0.7 | 0.6 |
| Noise generation limit angle (°) | Dry state | | no noise generation until rib misaligned | no noise generation until rib misaligned | no noise generation until rib misaligned | 3.7 | 3.8 | no noise generation until rib misaligned |
| | Wet state | | no noise generation until rib misaligned | 3.5 | 3.4 | 1.5 | 1.9 | 1.9 |
| | Abrasion resistance | | A | A | A | C | A | B |

*showing which fiber is contained in a large amount in each layer of the multiplayer knitted fabric As shown in Table 1, as Examples of the V-ribbed belt 1, there were prepared those in which cotton yarn was used as the cellulose-based natural spun yarn of the knitted fabric 6, the knitting ratio thereof was from 50% to 95% by mass, and a PTT/PET conjugate yarn was used as the polyester-based composite yarn (Examples 1 to 3, 5, and 6), those in which a PET/PU covering yarn was used as the polyester-based composite yarn (Examples 4 and 7), one in which a polyethylene glycol-type nonionic surfactant that is a nonionic surfactant was incorporated and adhered as a hydrophilizing agent to the knitted fabric 6 of Example 6 (Example 8), and those in which a polyether-modified silicone-based softener and a polyester-based softener that are hydrophilic softeners were incorporated and adhered, respectively (Examples 9 and 10). The knitted fabric structure in Examples 1 to 4 was a single layer and the knitted fabric structure in Examples 5 to 10 was a multilayer in which the cotton yarn was arranged in a large amount in the layer on the frictional power transmission surface side (belt front surface side).

In addition, as Comparative Examples, there were prepared one in which a cotton yarn of a cellulose-based natural spun yarn and a non-cellulose-based PU yarn were used for the knitted fabric 6, the knitted fabric structure was a single layer, and the knitting ratio of the cotton yarn was 60% by mass (Comparative Example 1), one in which a cotton yarn and a PTT/PET conjugate yarn were used for the knitted fabric 6, the knitted fabric structure was a multilayer, and the knitting ratio of the cotton yarn was 30% by mass (Comparative Example 2), and one in which the cotton yarn was arranged in a large amount on the rubber side (compression layer side) opposite to the belt front surface in the multiplayer knitted fabric 6 of Example 6 (Comparative Example 3). The knitted fabrics 6 of Examples 1 to 10 and Comparative Examples 1 to 3 were all knitted by weft knitting.

In table 1, the bulkiness of these knitted fabrics 6 were also shown. The bulkiness in Examples 1 to 10 is from 2.0 to 3.2 cm³/g, while it is 1.6 cm³/g in Comparative Example 1, 2.6 cm³/g in Comparative Example 2, and 3.2 cm³/g in Comparative Example 3.

TABLE 2

| Material | Rubber for extension layer | Rubber for compression layer | Rubber for adhesive treatment |
|---|---|---|---|
| EDPM polymer *1 | 100 | 100 | 100 |
| Zinc oxide | 5 | 5 | 5 |
| Stearic acid | 1 | 1 | 1 |
| Carbon black HAF | 80 | 80 | 80 |
| Paraffin-based oil *2 | 0 | 10 | 0 |
| Aging inhibitor *3 | 2 | 2 | 2 |
| Organic peroxide *4 | 5 | 5 | 5 |
| Nylon flock (fiber length: about 0.5 mm) | 20 | 0 | 0 |
| Total | 213 | 203 | 193 |

*1: "IP3640" manufactured by DuPont Dow Elastomer Japan
*2: "Diana Process Oil" manufactured by Idemitsu Kosan Co., Ltd.
*3: "NONFLEX OD3" manufactured by Seiko Chemical Co., Ltd.
*4: "Perkadox 14rp" manufactured by Kayaku Akzo Corporation As shown in Table 2, in Examples 1 to 10 and Comparative Examples 1 to 3, the rubber compositions of the rubbers for the extension layers, the rubbers for the compression layers, and the rubbers for the adhesive treatment of the knitted fabrics 6 were prepared to have the same formulations, respectively, and each V-ribbed belt 1 was produced by the same production method illustrated in FIG. 4. Incidentally, as for the rubber sheets 3S and 4S to be used for the extension layer 3 and the compression layer 4, a rubber having a formulation shown in Table 2 was subjected to rubber kneading using a known method such as a Banbury mixer and the kneaded rubber was allowed to pass through a calender roll to have a predetermined thickness. As for the rubber for the adhesive treatment, a rubber composition having a formulation shown in Table 2 was dissolved in an organic solvent to form a rubber paste and the knitted fabric 6 was subjected to an immersion treatment in the rubber paste.

For each of the V-ribbed belts 1 of the above Examples 1 to 10 and Comparative Examples 1 to 3, a rubber exudation observation test for observing the presence of rubber exudation onto the frictional power transmission surface, a test for measuring friction coefficient, a test for evaluating misalignment noise generation, and an abrasion resistance test were performed.

Figure 5A:
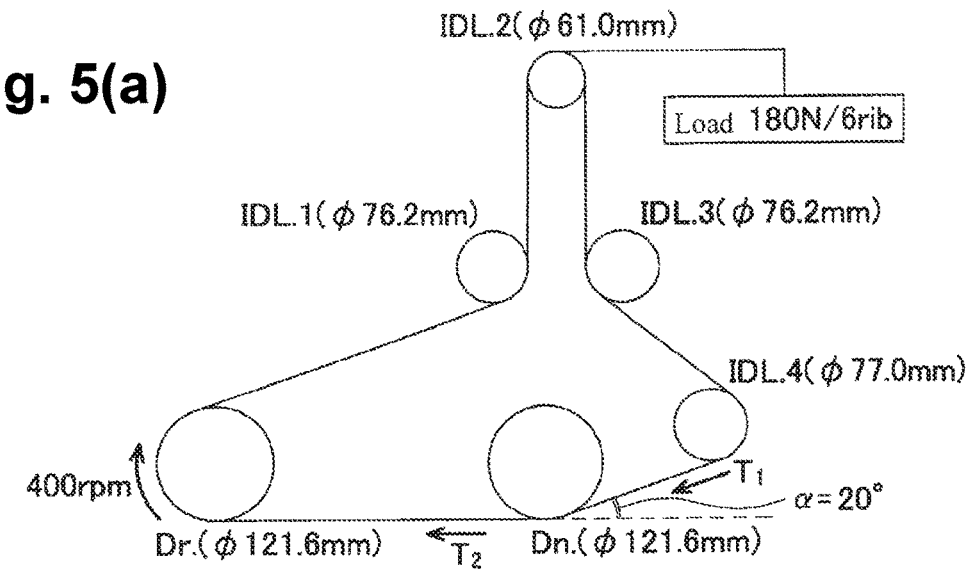
FIGS. 5(a) and (b) are conceptual diagrams illustrating tests for measuring friction coefficient in a dry state and in a wet state, respectively.
Figure 5B:
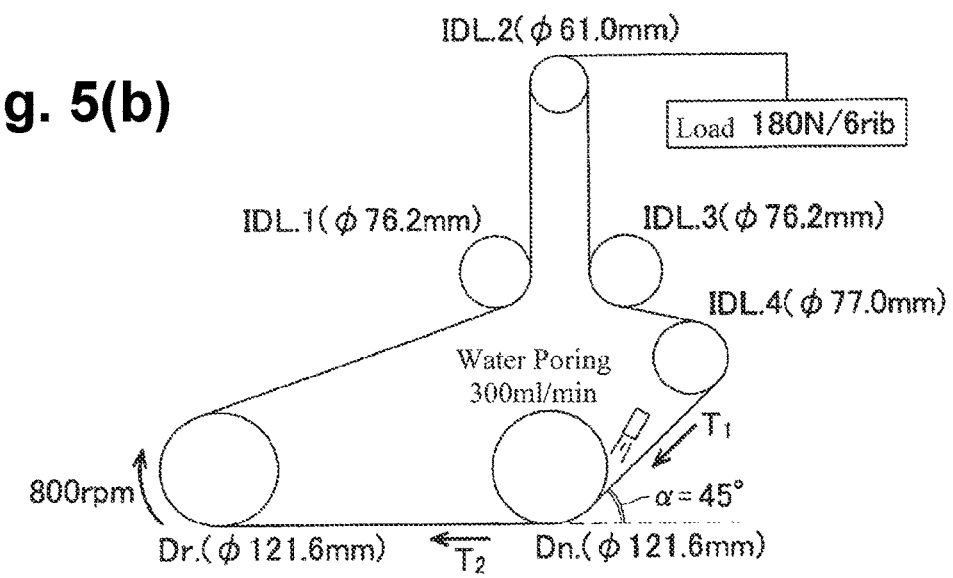

The test for measuring friction coefficient was performed, as illustrated in FIG. 5, by using a test machine in which a driving pulley (Dr.) having a diameter of 121.6 mm, an idler pulley (IDL. 1) having a diameter of 76.2 mm, an idler pulley (IDL. 2) having a diameter of 61.0 mm, an idler pulley (IDL. 3) having a diameter of 76.2 mm, an idler pulley (IDL. 4) having a diameter of 77.0 mm, and a driven pulley (Dn.) having a diameter of 121.6 mm were disposed and by stretching the V-ribbed belt around these individual pulleys.

As illustrated in (a) of FIG. 5, in the test in a dry state presuming an ordinary driving, the V-ribbed belt 1 was made traveling under room-temperature conditions while controlling the number of rotations of the driving pulley (Dr.) to 400 rpm, controlling the belt winding angle α to the driven pulley (Dn.) to π/9 radian (20°), and imparting a constant load (180 N/6 rib), and then, the torque of the driven pulley (Dn.) was increased and the friction coefficient μ was determined by using the equation (1) from the torque value of the driven pulley (Dn.) at the time when the slip velocity of the V-ribbed belt 1 against the driven pulley (Dn.) reached maximum (100% slip):

$$\mu = \ln(T_1/T_2)/\alpha \qquad (1)$$

Here, $T_1$ is a tight-side tension and $T_2$ is a slack-side tension. The slack-side tension $T_2$ on the outlet side of the driven pulley (Dn.) becomes equal to the constant load (180 N/6 rib) and the tight-side tension $T_1$ on the inlet side becomes a value of the constant load plus a tension resulting from the torque of the driven pulley (Dn.).

As shown in (b) of FIG. 5, in the test in a wet state presuming a driving in rainy weather, the number of rotations of the driving pulley (Dr.) was controlled to 800 rpm and the belt winding angle α to the driven pulley (Dn.) was controlled to π/4 radian (45°), and water was poured to the vicinity of the inlet of the driven pulley (Dn.) in a rate of 300 ml per minute. The other conditions were the same as in the test in the dry state. The friction coefficient μ was determined by using the equation (1).

Figure 6:
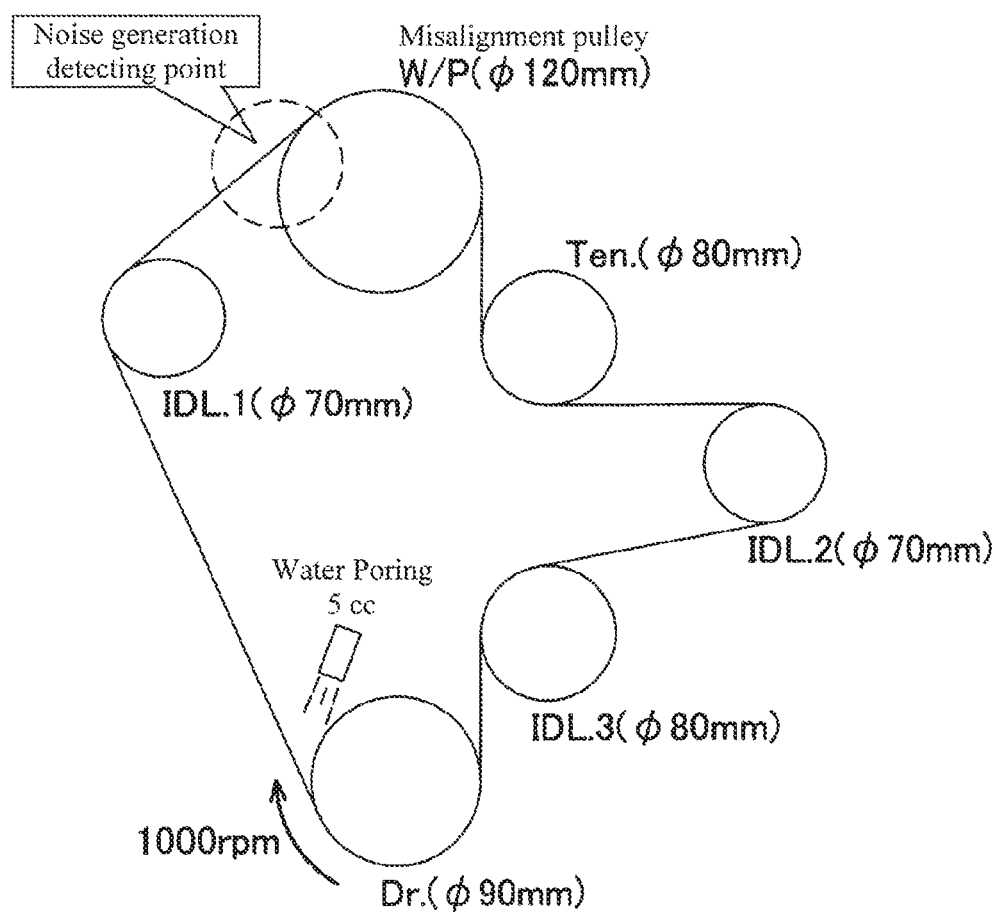
FIG. 6 is a conceptual diagram illustrating a test for evaluating misalignment noise generation.

For the test for evaluating misalignment noise generation, as illustrated in FIG. 6, used was a test machine in which a driving pulley (Dr.) having a diameter of 90 mm, an idler pulley (IDL. 1) having a diameter of 70 mm, a misalignment pulley (W/P) having a diameter of 120 mm, a tension pulley (Ten.) having a diameter of 80 mm, an idler pulley (IDL. 2) having a diameter of 70 mm, and an idler pulley (IDL. 3) having a diameter of 80 mm were disposed, the span between the shafts of the idler pulley (IDL. 1) and the misalignment pulley (W/P) was set at 135 mm, and adjustment was performed so that all the pulleys were positioned on the same plane (angle of misalignment: 0°).

Then, the V-ribbed belt 1 was stretched around individual pulleys of the test machine. The V-ribbed belt was made traveling in such misalignment that, under room-temperature conditions, the number of rotations of the driving pulley (Dr.) is controlled to 1000 rpm, the belt tension was controlled to 300 N/6 rib, 5 cc of water was poured on the frictional power transmission surface of the V-ribbed belt 1 periodically (at intervals of about 30 seconds) in the vicinity of the outlet of the driving pulley (Dr.), and the misalignment pulley (W/P) was moved to the front side relative to the other pulleys (the angle of the misalignment was gradually increased), and then the angle (noise generation limit angle) of the misalignment at the time when noise was generated in the vicinity of inlet of the misalignment pulley (W/P) was determined. In addition, with presuming an ordinary driving, the noise generation limit angle was similarly determined also in a dry state that water was not poured. Incidentally, the larger noise generation limit angle indicates that the noise suppression properties are more excellent. When the noise generation limit angle was 2° or more, it was judged that the noise suppression properties were good in a dry state and in a wet state.

For the abrasion resistance test, used was a test machine in which a driving pulley (Dr.) having a diameter of 120 mm, an idler pulley (IDL. 1) having a diameter of 75 mm, a tension pulley (Ten.) having a diameter of 60 mm, and a driven pulley (Dn.) having a diameter of 120 mm were disposed in this order, although illustration was omitted. The V-ribbed belt 1 was stretched around these pulleys and was made traveling under an atmosphere of 120° C. for 24 hour while controlling the number of rotations of the driving pulley (Dr.) to 4900 rpm and applying an axle load of 91 kgf to the tension pulley (Ten.) as an initial load, and then the belt mass was measured before and after the test and an abrasion rate was determined by using the equation (2).

Abrasion rate=(Mass before test−Mass after test)/(Mass before test)×100(%)     (2)

Incidentally, as for the judgment of the abrasion resistance, the case where the abrasion rate is 2.5% or less was taken as "A", the case of more than 2.5% and 3.5% or less was taken as "B", and the case of more than 3.5% was taken as "C".

The results of the aforementioned individual tests are collectively shown in Table 1. In the rubber exudation observation test, slight rubber exudation was observed in Examples 1 to 4 where the knitted fabric structure was a single layer using a bulky yarn for the knitted fabric 6 and the bulkiness was from 2.0 to 2.3 cm$^3$/g and in Example 10 where the bulkiness was 2.6 cm$^3$/g and a polyester-based softener was used as a hydrophilizing agent. No rubber exudation was observed in Examples 5 to 9 and Comparative Examples 2 and 3 where the knitted fabric structure was a multilayer and the bulkiness was from 2.4 to 3.2 cm$^3$/g. On the other hand, remarkable rubber exudation was observed in Comparative Example 1 where a bulky yarn was not used for the knitted fabric, the knitted fabric structure was a single layer, and the bulkiness was 1.6 cm$^3$/g. From these test results, it was realized that the bulkiness of the knitted fabric 6 is preferably 2.0 cm$^3$/g or more, and further preferably 2.4 cm$^3$/g or more.

In the test for measuring friction coefficient, in Examples 1, 2, and 4 to 10, the difference $\Delta\mu$ in the friction coefficient $\mu$ between the dry state and the wet state is 0.3 or less in every case and thus good results are obtained. In Example 3, the difference $\Delta\mu$ is 0.6, which is slightly larger than in the other Examples. Of these, in Examples 5 to 9 where the bulkiness is 2.4 cm³/g or more, no rubber exudation was observed, and the knitting ratio of the cotton yarn was from 60 to 80% by mass so that the cotton yarn was much arranged in the layer on the frictional power transmission surface side, the difference $\Delta\mu$ in the friction coefficient $\mu$ is very small such as 0.1 or less. Particularly, in Example 6 where the bulkiness was 3.2 cm³/g and Examples 8 and 9 where a hydrophilizing agent was incorporated or adhered to the knitted fabric 6, such a good result that the difference $\Delta\mu$ disappeared was obtained. On the other hand, in Comparative Example 1 where the rubber exudation was much observed, the fiction coefficient $\mu$ in the dry state increased and also the fiction coefficient $\mu$ in the wet state decreased, so that the difference $\Delta\mu$ became very large such as 1.2. Furthermore, in Comparative Example 2 where the rubber exudation was not observed but the knitting ratio of the cotton yarn was decreased to 30% by mass and in Comparative Example 3 where the knitted fabric structure was a multilayer and the cotton yarn was much arranged in the layer on the rubber side (opposite side to the frictional power transmission surface), the fiction coefficient $\mu$ was decreased in the wet state and the difference $\Delta\mu$ became slightly large such as 0.6 to 0.7.

In the test for evaluating misalignment noise generation, the noise generation limit angle was large such as 3.7° or more and good noise suppression properties were obtained in the test in the dry state but, in the test in the wet state, the noise generation limit angle was lower than 2.0° in Comparative Examples 1 to 3 and thus sufficient noise suppression properties were not obtained. On the other hand, in Examples 1 to 10, the noise generation limit angle always became large such as 2.0° or more even in the wet state and good noise suppression properties were obtained. Particularly, in Example 8 where a nonionic surfactant was used as a hydrophilizing agent for the knitted fabric 6, such very good noise suppression properties that no noise was generated until rib misaligned even in the wet state was obtained.

In the abrasion resistance test, in Examples 1 to 10 and Comparative Examples 2 and 3 where a polyester-based composite yarn was used for the knitted fabric 6, good abrasion resistance was obtained in every case. In Examples 1 and 4 where the knitting ratio of the cotton yarn was increased to 80% by mass, a tendency of slight decrease in the abrasion resistance was observed but abrasion resistance free from problems is obtained. On the other hand, in Comparative Example 1 where a polyester-based composite yarn was not used for the knitted fabric 6, sufficient abrasion resistance was not obtained.

Incidentally, although not shown in Table 1, in Examples 8 and 9 where a polyether-modified silicone-based softener or a polyester-based softener that is a hydrophilic softener was incorporated or adhered as a hydrophilyzing agent to the knitted fabric 6, the flexibility of the knitted fabric 6 was improved and winkles can be prevented, and also there was observed an effect of facilitating winding thereof on a mold at the time of belt production.

In the aforementioned embodiments, the bulky yarn of the polyester-based composite yarn for knitting the knitted fabric was a PTT/PET conjugate yarn or a PET/PU covering yarn and the cellulose-based natural spun yarn was a cotton yarn but the bulky yarn of the polyester-based composite yarn may be another composite yarn and the cellulose-based natural spun yarn may also be another natural spun yarn such as a silk yarn or a hemp yarn.

Moreover, in the aforementioned embodiments, the hydrophilizing agent is incorporated or adhered to the knitted fabric by an immersion treatment but the hydrophilizing agent may be incorporated or adhered to the knitted fabric by another method such as a spraying method or a coating method. In the case where a surfactant is used as the hydrophilizing agent, the surfactant may be incorporated into the knitted fabric by applying the surfactant on the surface of the cylindrical outer mold on which the rib molds are engraved and performing vulcanization and molding at the time of belt production.

Furthermore, in the aforementioned embodiments, the surfactant for use in the hydrophilization treatment of the knitted fabric is a polyethylene glycol-type nonionic surfactant (polyoxyalkyl ether) that is a nonionic surfactant but the surfactant may be another nonionic surfactant or an ionic surfactant. In addition, the hydrophilic softener for use in the hydrophilization treatment is a polyether-modified silicone-based softener or a polyester-based softener but another hydrophilic softener may be used.

While the present invention has been described in detail and with reference to specific embodiments thereof, it will be apparent to one skilled in the art that various modifications and changes can be made therein without departing from the spirit and scope thereof.

The present application is based on Japanese Patent Application No. 2013-071815 filed on Mar. 29, 2013 and Japanese Patent Application No. 2014-053213 filed on Mar. 17, 2014, and the contents thereof are incorporated herein by reference.

DESCRIPTION OF REFERENCE NUMERALS AND SIGNS

1 V-ribbed belt
2 rib
3 extension layer
4 compression layer
5 tension member
6 knitted fabric
10 molded body
21 driving pulley
22 driven pulley
23 V-shaped groove
51 flexible jacket
52 inner mold
53 outer mold
53*a* rib mold

The invention claimed is:
1. A V-ribbed belt comprising
an extension layer that forms a belt back face;
a compression layer provided on one side of the extension layer; and
a tension member that is embedded between the extension layer and the compression layer and extends in a belt circumferential length direction,
wherein the compression layer has a plurality of V-shaped ribs formed to be extending in the belt circumferential length direction and to be a frictional power transmission surface with a pulley, the frictional power transmission surface being covered with a knitted fabric, and
wherein the knitted fabric is knitted out of a polyester-based composite yarn and a cellulose-based natural spun yarn, the polyester-based composite yarn being a bulky yarn, and a knitting ratio of the cellulose-based natural spun yarn being not less than a knitting ratio of the polyester-based composite yarn, and wherein the bulky yarn contains at least one of the group consisting of composite yarns (conjugate yarns), covering yarns, crimped yarns, woolly textured yarns, taslan textured yarns, and interlace textured yarns.

2. The V-ribbed belt according to claim 1, wherein the knitting ratio of the cellulose-based natural spun yarn is from 50% to 95% by mass.

3. The V-ribbed belt according to claim 1, wherein the polyester-based composite yarn is a composite yarn in which polytrimethylene terephthalate (PTT) and polyethylene terephthalate (PET) are conjugated, or a composite yarn in which a polyurethane (PU) yarn is used as a core and its surface is covered with polyethylene terephthalate (PET).

4. The V-ribbed belt according to claim 1, wherein the cellulose-based natural spun yarn is a cotton yarn.

5. The V-ribbed belt according to claim 1, wherein the knitted fabric is a multilayered knitted fabric.

6. The V-ribbed belt according to claim 5, wherein the cellulose-based natural spun yarn is arranged in the largest amount in the layer on a frictional power transmission surface side among the layers of the multilayered knitted fabric.

7. The V-ribbed belt according to claim 1, wherein a bulky layer of the knitted fabric is provided on the frictional power transmission surface.

8. The V-ribbed belt according to claim 1, wherein the knitted fabric is incorporated or adhered with a hydrophilizing agent.

9. The V-ribbed belt according to claim 1, wherein the knitted fabric is knitted by weft knitting.

10. The V-ribbed belt according to claim 1, wherein the polyester-based composite yarn is formed from two or more kinds of polymers.

11. The V-ribbed belt according to claim 1, wherein the knitted fabric has a bulkiness of $2.0 \text{ cm}^3/\text{g}$ or more.

* * * * *